(12) United States Patent
Nakamura

(10) Patent No.: US 8,725,213 B2
(45) Date of Patent: May 13, 2014

(54) WIRELESS COMMUNICATION DEVICE

(75) Inventor: Atsunori Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/501,346

(22) PCT Filed: Sep. 15, 2010

(86) PCT No.: PCT/JP2010/005621
§ 371 (c)(1),
(2), (4) Date: Apr. 11, 2012

(87) PCT Pub. No.: WO2011/048747
PCT Pub. Date: Apr. 28, 2011

(65) Prior Publication Data
US 2012/0196651 A1    Aug. 2, 2012

(30) Foreign Application Priority Data
Oct. 19, 2009    (JP) ................................ 2009-240141

(51) Int. Cl.
*H04M 1/00* (2006.01)

(52) U.S. Cl.
USPC .................. 455/562.1; 455/550.1; 455/556.1; 455/575.1

(58) Field of Classification Search
USPC ............. 455/562.1, 550.1, 556.1, 575.7, 557, 455/552.1, 553.1, 566, 575.6, 575.1, 90.3
See application file for complete search history.

(56) References Cited

U.S. PATENT DOCUMENTS

| 5,704,145 | A  | * | 1/1998 | Hanitz ............................. 40/473 |
| 6,980,782 | B1 | * | 12/2005 | Braun et al. ............... 455/277.2 |
| 7,010,313 | B2 | * | 3/2006 | Vilmur et al. ................. 455/513 |
| 7,043,209 | B2 | * | 5/2006 | Hirota ........................... 455/101 |
| 2004/0041734 | A1 | * | 3/2004 | Shiotsu et al. ............... 343/702 |
| 2004/0061662 | A1 | * | 4/2004 | Yoshihara et al. ............. 345/1.1 |
| 2005/0091431 | A1 | * | 4/2005 | Olodort et al. .................. 710/72 |
| 2005/0093753 | A1 | * | 5/2005 | Masaki ........................ 343/702 |
| 2005/0146470 | A1 | * | 7/2005 | Li et al. ......................... 343/702 |
| 2006/0164799 | A1 | * | 7/2006 | Varela .......................... 361/680 |
| 2006/0276221 | A1 | * | 12/2006 | Lagnado et al. ........... 455/552.1 |
| 2007/0188380 | A1 | * | 8/2007 | Duong et al. ................. 342/374 |
| 2007/0200775 | A1 |   | 8/2007 | Hirota |

FOREIGN PATENT DOCUMENTS

| CN | 1874182 | 12/2006 |
| CN | 1949905 | 4/2007 |
| CN | 101344828 | 1/2009 |
| JP | 07-263940 | 10/1995 |

(Continued)

OTHER PUBLICATIONS

International Search Report, PCT/JP2010/005621, Oct. 12, 2010.

(Continued)

*Primary Examiner* — Pablo Tran
(74) *Attorney, Agent, or Firm* — Young & Thompson

(57) ABSTRACT

A wireless communication device 100 is a device which performs wireless communication. The wireless communication device 100 includes a plurality of antennas 101a, 101b, . . . provided at different positions; and an antenna selection section (antenna selection element) 102 which acquires holding position specifying information for specifying a holding position which is a position where a user holds the wireless communication device 100, and from among the plurality of antennas 101a, 101b, . . . , selects an antenna provided at a position which is different from the holding position specified by the acquired holding position specifying information. The wireless communication device 100 is adapted to perform wireless communication via the selected antenna.

27 Claims, 8 Drawing Sheets

(56) References Cited

FOREIGN PATENT DOCUMENTS

| | | |
|---|---|---|
| JP | 2003-163956 | 6/2003 |
| JP | 2006-209647 | 8/2006 |
| JP | 2006-340359 | 12/2006 |
| JP | 2007-114584 | 5/2007 |
| JP | 2007-235329 | 9/2007 |

OTHER PUBLICATIONS

Chinese Office Action dated Dec. 4, 2013 in corresponding Chinese Patent Application No. 201080047356.0 with English translation of Chinese Office Action.

* cited by examiner

WIRELESS COMMUNICATION DEVICE

TECHNICAL FIELD

The present invention relates to a wireless communication device having a plurality of antennas.

BACKGROUND ART

A wireless communication device, which includes an antenna and performs wireless communication via the antenna, has been known. As one of this type of wireless communication devices, Patent Document 1 describes a wireless communication device having a plurality of antennas.

The wireless communication device detects a reception level which is an intensity of a radio signal received by each of the antennas. The wireless communication device is adapted to select an antenna in which the highest reception level is detected, and receive a radio signal received by the selected antenna. Thereby, the wireless communication device is able to prevent an excessive drop in the quality of wireless communication.

Patent Document 1: JP 7-263940 A

In the wireless communication device, however, it is necessary to provide a circuit for detecting reception levels and a circuit for comparing the detected reception levels. As such, in order to obtain areas for providing those circuits, there is a problem that such a wireless communication device is relatively large. Further, in the case where the wireless communication device is configured such that a processing device performs processing for comparing detected reception levels, there is also a problem that a load applied to the processing device is excessively large.

SUMMARY

Therefore, an object of the present invention is to provide a wireless communication device capable of solving the above-described problems, that is, "there are cases where the size of a wireless communication device is relatively large and where a load applied to a processing device is excessively large".

In order to achieve such an object, a wireless communication device, which is an aspect of the present invention, is a device which performs wireless communication.

The wireless communication device includes:

a plurality of antennas provided at different positions; and an antenna selection means for acquiring holding position specifying information for specifying a holding position which is a position where a user holds the wireless communication device, and from among the plurality of antennas, selecting an antenna provided at a position which is different from the holding position specified by the acquired holding position specifying information, wherein the wireless communication device is adapted to perform wireless communication via the selected antenna.

Further, a mobile phone device, which is another aspect of the present invention, is a device which performs wireless communication.

The mobile phone device includes:

a plurality of antennas provided at different positions; and an antenna selection means for acquiring holding position specifying information for specifying a holding position which is a position where a user holds the mobile phone device, and from among the plurality of antennas, selecting an antenna provided at a position which is different from the holding position specified by the acquired holding position specifying information, wherein the mobile phone device is adapted to perform wireless communication via the selected antenna.

Further, a wireless communication method, which is another aspect of the present invention, is a method applied to a wireless communication device which includes a plurality of antennas provided at different positions and performs wireless communication. The method includes:

acquiring holding position specifying information for specifying a holding position which is a position where a user holds the wireless communication device;

from among the plurality of antennas, selecting an antenna provided at a position which is different from the holding position specified by the acquired holding position specifying information; and performing wireless communication via the selected antenna.

Further, a program, which is another aspect of the present invention, causes a wireless communication device which includes a plurality of antennas provided at different positions and performs wireless communication, to realize an antenna selection means for acquiring holding position specifying information for specifying a holding position which is a position where a user holds the wireless communication device, and from among the plurality of antennas, selecting an antenna provided at a position which is different from the holding position specified by the acquired holding position specifying information, and to perform wireless communication via the selected antenna.

As the present invention is configured as described above, it is possible to reduce the size of the wireless communication device, and, if a processing device is provided, also possible to prevent an excessively large load from being applied to the processing device.

EXEMPLARY EMBODIMENTS

Hereinafter, exemplary embodiments of a wireless communication device, a mobile phone device, a wireless communication method, and a program will be described with reference to FIGS. 1 to 8.

First Exemplary Embodiment

Figure 1:
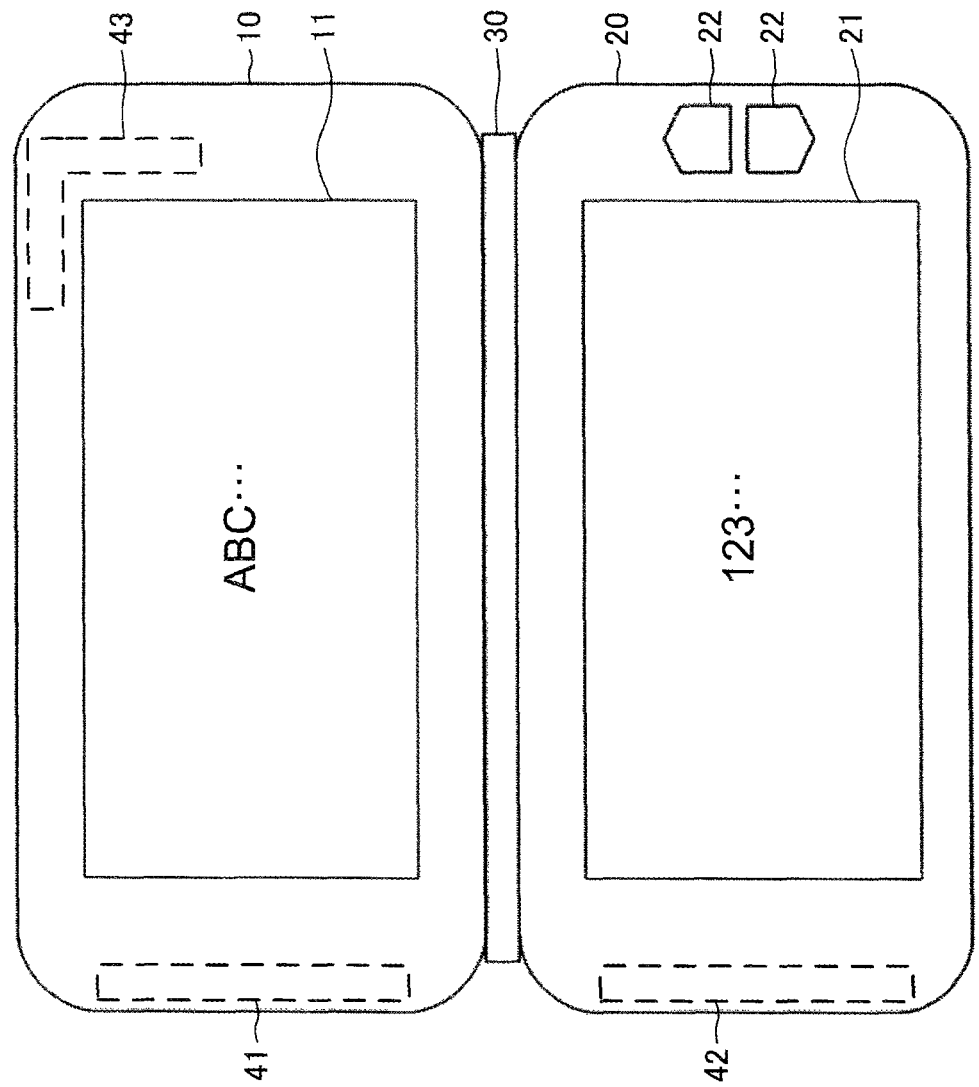
FIG. 1 is a diagram showing the schematic configuration of a wireless communication device according to a first exemplary embodiment of the present invention.

As shown in FIG. 1, a wireless communication device 1 according to a first exemplary embodiment includes a first body section 10, a second body section 20, and a hinge section 30. In this example, the wireless communication device 1 is a foldable mobile phone device.

The wireless communication device 1 also has a control section including a CPU (Central Processing Unit) and a storage device (in this example, memory), not shown, as described below. The control section controls the respective sections constituting the wireless communication device 1 by the CPU which executes a predetermined program stored in the memory.

Each of the first body section 10 and the second body section 20 is a flat plate member in a rectangle shape. The hinge section 30 swingably links an edge portion constituting one of the long sides in the edge part of the first body section 10 and an edge portion constituting one of the long sides in the edge part of the second body section 20.

The first body section 10 includes a first display 11 in a rectangle shape. The first display 11 is a display of a touch-screen type. The first display 11 receives image information representing an image formed of characters, graphics, and the like, from the control section. The first display 11 displays the image represented by the received image information.

Further, when a button included in the displayed image is pressed by a user (that is, when the first display 11 is pressed at a position where a button is shown), the first display 11 receives information associated with the button, and outputs the received information to the control section.

The second body section 20 has a second display 21 having functions similar to those of the first display 11. Further, the second body section 20 includes a plurality of (in this example, two) button switches 22.

In addition, the wireless communication device 1 includes a plurality of (in this example, three) antennas 41, 42, and 43. Each of the antennas 41, 42, and 43 is adapted to emit (transmit) a radio wave (electromagnetic wave) as a radio signal to the outside, and receive a radio wave as a radio signal from the outside. The antennas 41, 42, and 43 are provided at different positions.

The antenna 41 is buried inside the first body section 10. In the front view of the wireless communication device 1 in which the first body section 10 is positioned on the upper side and the second body section 20 is positioned on the lower side, the antenna 41 is arranged at the left edge portion of the first body section 10 (that is, an edge portion constituting one of the short sides in the edge part of the first body section 10).

The antenna (second antenna) 42 is buried inside the second body section 20. In the front view of the wireless communication device 1 in which the first body section 10 is positioned on the upper side and the second body section 20 is positioned on the lower side, the antenna 42 is arranged at a left edge portion of the second body section 20 (that is, an edge portion constituting one of the short sides in the edge part of the second body section 20).

The antenna (first antenna) 43 is buried inside the first body section 10. In the front view of the wireless communication device 1 in which the first body section 10 is positioned on the upper side and the second body section 20 is positioned on the lower side, the antenna 43 is arranged at an upper right corner of the first body section 10 (that is, an edge portion constituting an intersection of one of the long sides and one of the short sides in the edge part of the first body section 10).

Figure 2:
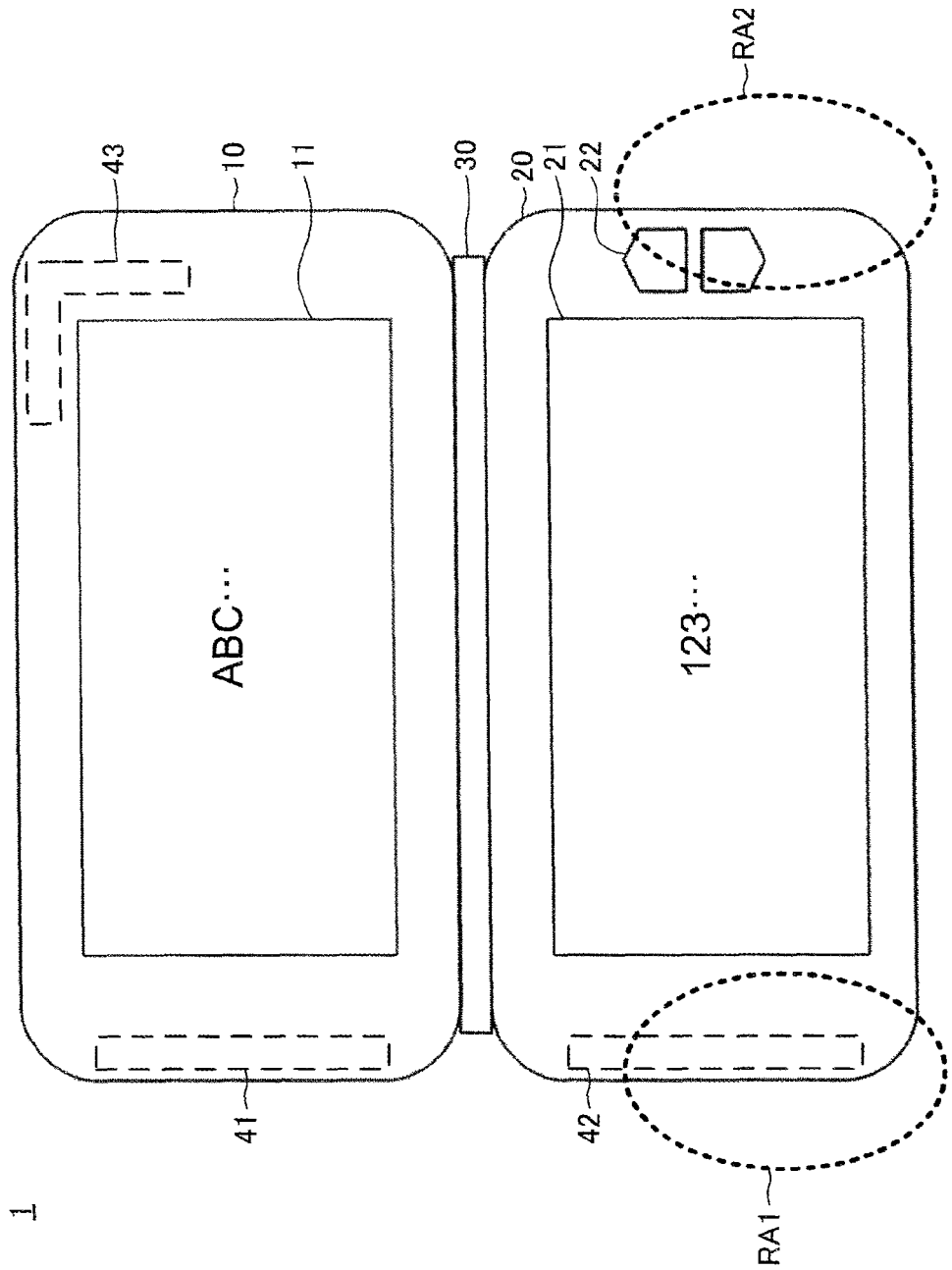
FIG. 2 is a diagram showing the wireless communication device in the case where the device rotational position is a first device rotational position.

In this example, as shown in FIGS. 1 and 2, a device rotational position in a state where the first body section 10 is positioned on the upper side and the second body section 20 is positioned on the lower side, when a user views the wireless communication device 1, is called a first device rotational position. It should be noted that a device rotational position is a rotational position (position in a rotational direction, rotational angle) of the wireless communication device 1 relative to a user.

Figure 3:
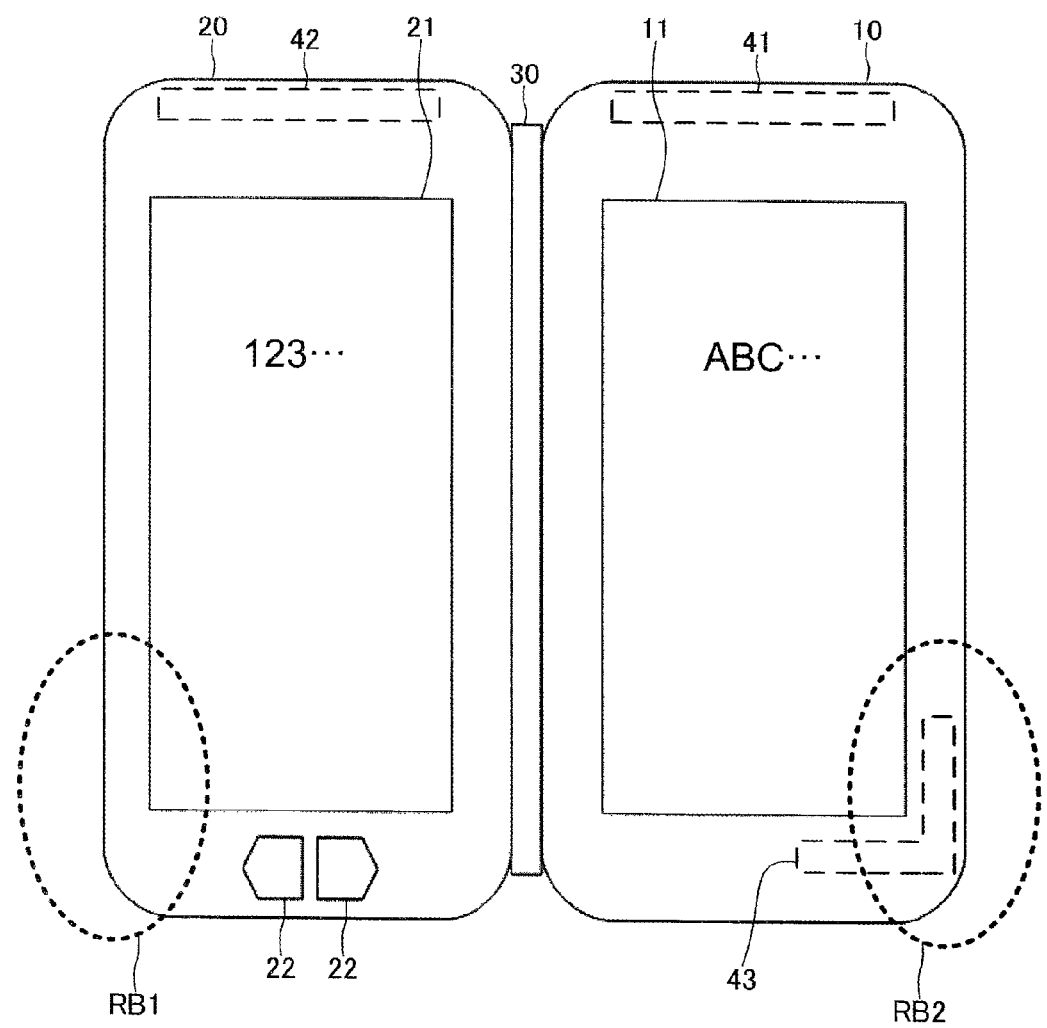
FIG. 3 is a diagram showing the wireless communication device in the case where the device rotational position is a second device rotational position.

Further, as shown in FIG. 3, a device rotational position in a state where the first body section 10 is positioned on the right side and the second body section 20 is positioned on the left side, when a user views the wireless communication device 1, is called a second device rotational position. As such, in this example, the first device rotational position and the second device rotational position are rotational positions in which the device rotational positions are shifted by 90 degrees.

Accordingly, when the device rotational position is the second device rotational position, the second antenna 42 is located at an upper edge portion of the wireless communication device 1. As such, when the device rotational position is the second device rotational position, it can be said that the second antenna 42 is arranged at an edge portion (second edge portion) having the longest distance from the user.

Further, when the device rotational position is the first device rotational position, the first antenna 43 is located at an upper edge portion of the wireless communication device 1. As such, when the device rotational position is the first device rotational position, it can be said that the first antenna 43 is arranged at an edge portion (first edge portion) having the longest distance from the user.

Meanwhile, a user is likely to hold edge portions having the shortest distance from the user (that is, edge portions of the lower side) in the edge part of the wireless communication device 1. As such, according to the above-described configuration, when the device rotational position is the first device rotational position, the first antenna 43 is at a position different from the holding position, while when the device rotational position is the second device rotational position, the second antenna 42 is at a position different from the holding position.

As a result, the wireless communication device 1 is able to select an antenna arranged at a position different from the holding position reliably, even when the device rotational position is either the first device rotational position or the second device rotational position.

Figure 4:
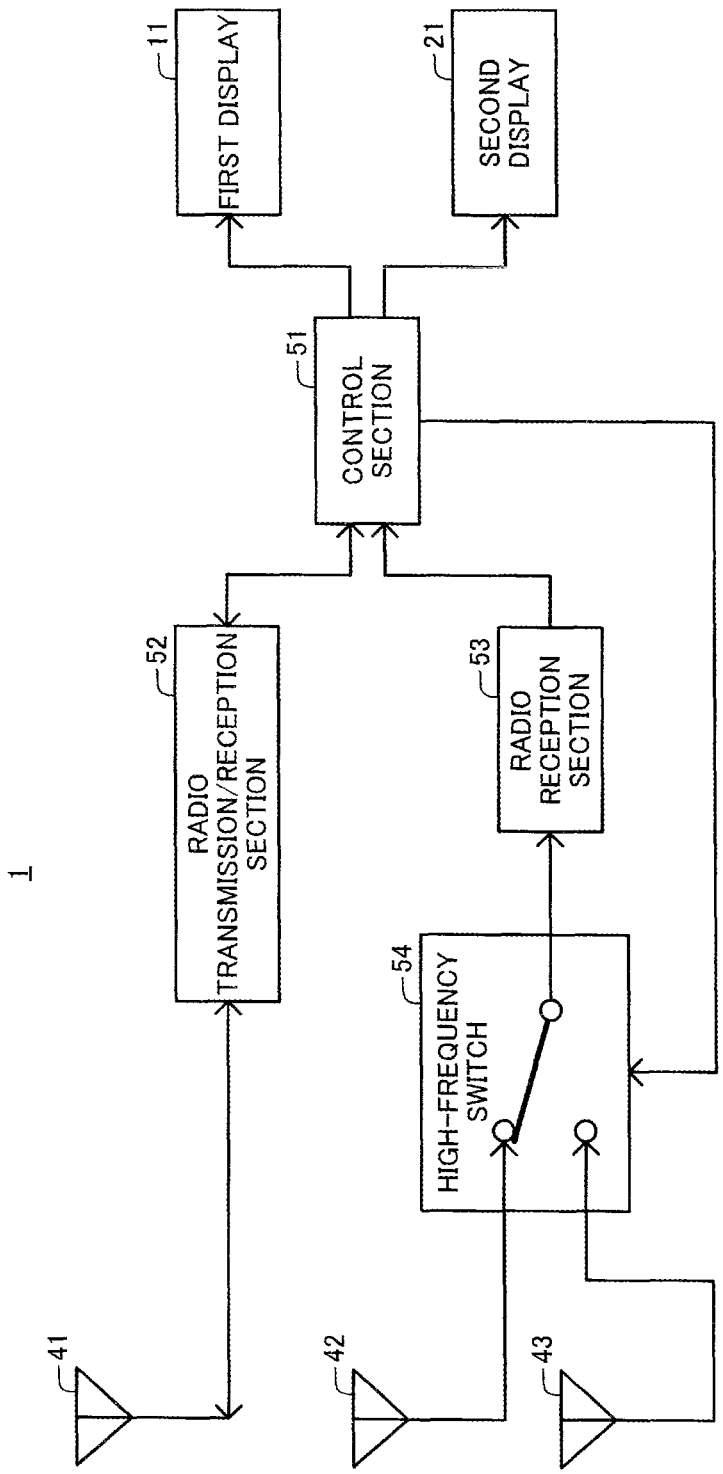
FIG. 4 is a block diagram showing the schematic configuration of the wireless communication device according to the first exemplary embodiment of the present invention.

In addition, as shown in FIG. 4, the wireless communication device 1 includes a control section (image information generation means, antenna selection means, information storage means) 51, a radio transmission/reception section 52, a radio reception section 53, and a high-frequency switch 54.

The control section 51 selects an image rotational position from a plurality of different image rotational positions, in accordance with an instruction output from the running program or in accordance with an instruction input by a user. It should be noted that an image rotational position is a rotational position of an image relative to the display (the first display 11 or the second display 21, that is, the wireless communication device 1).

In this example, the control section 51 selects either one of the first image rotational position and the second image rotational position. The first image rotational position is an image rotational position in which when the device rotational position is the first device rotational position, the upper direction of the display coincides with the upper direction of the image, as shown in FIG. 2. As such, in this example, an image taking the first image rotational position is a (landscape) image in which the horizontal length is longer than the vertical length.

Figure 5:
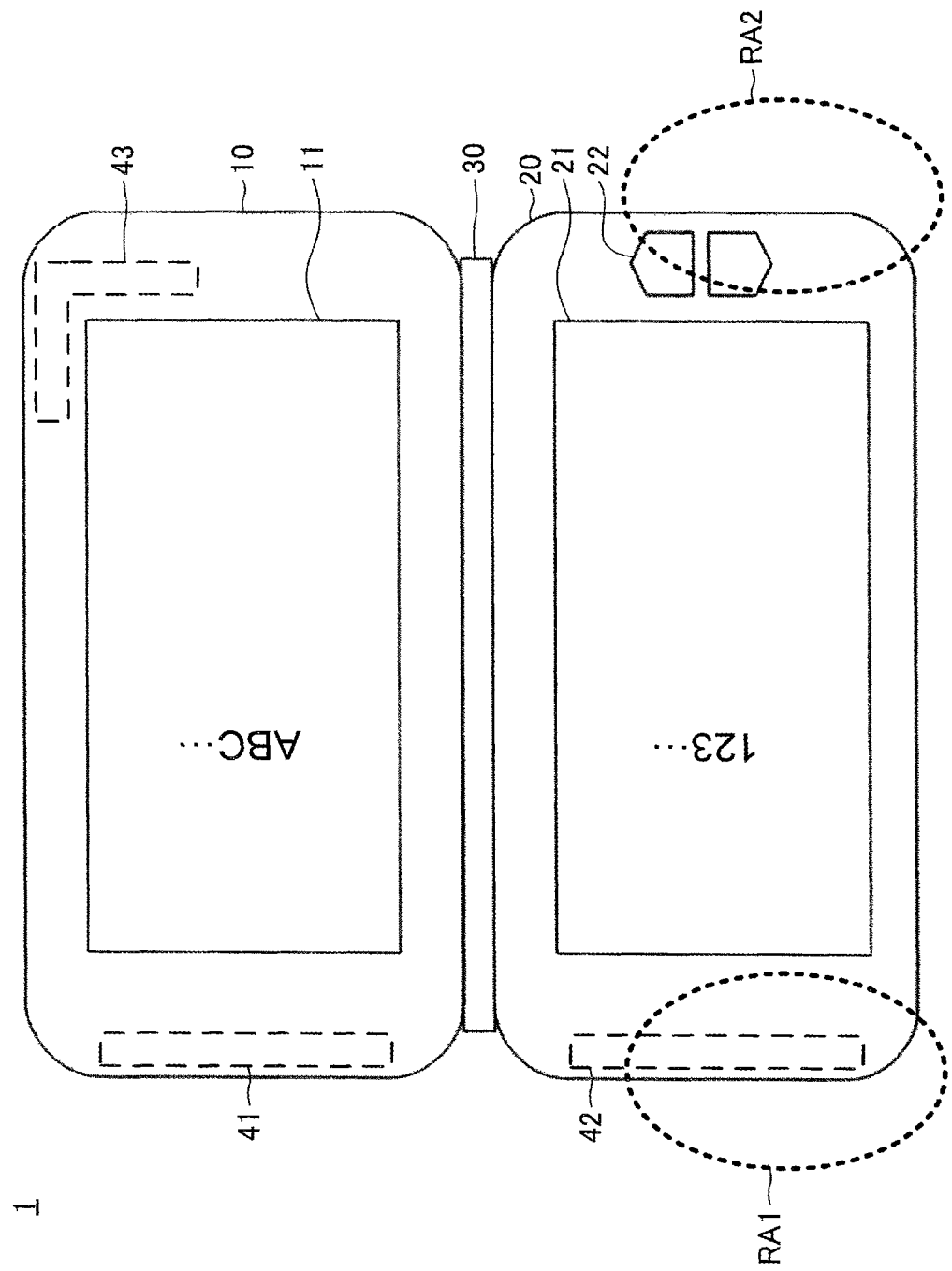
FIG. 5 is a diagram showing the wireless communication device in the case where the device rotational position is the first rotational position and an image rotational position is a second image rotational position.

On the other hand, the second image rotational position is an image rotational position in which when the device rotational position is the first device rotational position, the upper direction of the display coincides with the right direction of the image, as shown in FIG. 5. As such, in this example, an image taking the second image rotational position is a (portrait) image in which the horizontal length is shorter than the vertical length. As described above, in this example, the first image rotational position and the second image rotational position are rotational positions in which the image rotational positions are shifted by 90 degrees.

The control section 51 generates image information representing an image taking the selected image rotational position for the first display 11 and the second display 21, respectively. The control section 51 outputs the generated image information to the first display 11 and the second display 21, respectively.

The control section 51 also generates transmission information, and outputs the generated transmission information to the radio transmission/reception section 52. Further, the control section 51 receives reception information from the radio transmission/reception section 52 and the radio reception section 53, respectively.

The radio transmission/reception section 52 receives the transmission information from the control section 51. The radio transmission/reception section 52 transmits a radio signal based on the received transmission information from the antenna 41. Further, the transmission/reception section 52 receives a radio signal received by the antenna 41. The radio transmission/reception section 52 outputs reception information based on the received radio signal to the control section 51.

Further, the control section 51 acquires holding position specifying information for specifying the holding position which is the position where the user holds the wireless communication device 1. In this example, the control section 51 acquires image rotational position information representing the selected image rotational position as holding position specifying information.

In addition, the control section 51 selects, from among the antennas 42 and 43, an antenna arranged at a position different from the holding position specified by the acquired holding position specifying information. As such, in this example, the control section 51 selects either one of the first antenna 43 and the second antenna 42.

Specifically, the control section 51 stores, in advance, holding position specifying information and antenna specifying information for specifying an antenna in association with each other, in a storage device. As such, the storage device stores holding position specifying information representing the first image rotational position and antenna specifying information for specifying the first antenna 43 in association with each other, and stores holding position specifying information representing the second image rotational position and antenna specifying information for specifying the second antenna 42 in association with each other. Then, the control section 51 selects an antenna specified by the antenna specifying information stored in the storage device in association with the acquired holding position specifying information.

The control section 51 outputs a selection instruction signal indicating the selected antenna to the high-frequency switch 54.

The high-frequency switch 54 is adapted to switch a state to either one of a first state where a radio signal received by the first antenna 43 is output to the radio reception section 53 and a second state where a radio signal received by the second antenna 42 is output to the radio reception section 53.

The high-frequency switch 54 receives the selection instruction signal from the control section 51. If the antenna represented by the received selection instruction signal is the first antenna 43, the high-frequency switch 54 sets the state to the first state. On the other hand, if the antenna represented by the received selection instruction signal is the second antenna 42, the high-frequency switch 54 sets the state to the second state.

The radio reception section 53 receives the radio signal received by the first antenna 43 or the second antenna 42, via the high-frequency switch 54. The radio reception section 53 outputs reception information based on the received radio signal, to the control section 51.

With this configuration, it can be said that the wireless communication device 1 is adapted to perform wireless communication via a selected antenna.

Next, operation of the wireless communication device 1 will be described in a specific manner.

Now, as shown in FIG. 2, it is assumed that the first display 11 and the second display 21 output images taking the first image rotational position.

In this case, a user holds the wireless communication device 1 at an area encircled by an ellipse RA1 by the left hand, and holds the wireless communication device 1 at an area encircled by an ellipse RA2 by the right hand.

In this case, the control section 51 selects the first antenna 43, and outputs a selection instruction signal indicating the first antenna 43 to the high-frequency switch 54, as described above. Thereby, the high-frequency switch 54 sets the state to the first state. Thereby, the wireless communication device 1 performs wireless communication via the first antenna 43 which is the selected antenna, and the antenna 41.

As such, the wireless communication device 1 performs wireless communication via the antennas 41 and 43 arranged at positions different from the holding position. Consequently, it is possible to prevent an excessive drop in the quality of wireless communication.

Next, the case where the image rotational position of an image represented by image information output by the control section 51 is changed from the first image rotational position to the second image rotational position is assumed.

In this case, as shown in FIG. 5, the first display 11 and the second display 21 output images taking the second image rotational position.

A user who views these images changes the holding position. As such, as shown in FIG. 3, the user holds the wireless communication device 1 at an area encircled by an ellipse RB1 by the left hand and holds the wireless communication device 1 at an area encircled by an ellipse RB2 by the right hand.

In this case, the control section 51 selects the second antenna 42 and outputs a selection instruction signal indicating the second antenna 42 to the high-frequency switch 54. Thereby, the high-frequency switch 54 switches the state to the second state. Thereby, the wireless communication device 1 performs wireless communication via the second antenna 42 which is the selected antenna, and the antenna 41.

As such, the wireless communication device 1 performs wireless communication via the antennas 41 and 42 arranged at positions different from the holding position. Consequently, it is possible to prevent an excessive drop in the quality of wireless communication.

As described above, according to the first exemplary embodiment of the wireless communication device of the present invention, the wireless communication device 1 is able to perform wireless communication via antennas arranged at positions different from the holding position. Consequently, it is possible to prevent an excessive drop in the quality of wireless communication.

Further, according to the first exemplary embodiment, it is not necessary to provide a circuit for detecting reception levels and to provide a circuit for comparing detected reception levels. Accordingly, the size of the wireless communication device 1 can be reduced. Further, as the processing device is not required to perform processing to compare detected reception levels, it is also possible to prevent an excessively large processing load.

Furthermore, in the first exemplary embodiment, the control section 51 is adapted to acquire image rotational information representing the selected image rotational position as holding position specifying information.

If the rotational position of the image relative to the display (first display 11 and second display 21) changes, the user is likely to change the holding position. As such, according to the first exemplary embodiment, it is possible to acquire holding position specifying information according to actual holding position with high accuracy.

It should be noted that an exemplary variation of the first exemplary embodiment, the control section 51 may be adapted to acquire, after a preset delay time has elapsed from the point of time when the selected image rotational position was changed, image rotational position information representing the image rotational position after the change, as holding position specifying information.

When the image rotational position of the image shown on the display is changed, it often takes a delay time from the point of time when the image rotational position was changed until the user changes the holding position of the wireless communication device 1. As such, according to this exemplary variation, the time when the holding position was actually changed and the time of changing the selected antenna can be closer. Consequently, it is possible to prevent an excessive drop in the quality of wireless communication, more reliably.

Further, while the wireless communication device 1 is adapted to receive a radio signal received by the antenna selected based on the holding position specifying information (that is, receive a radio signal via the selected antenna), in another exemplary variation of the first exemplary embodiment, the wireless communication device 1 may be adapted to transmit a radio signal via the selected antenna. Further, the wireless communication device 1 may be adapted to transmit and receive a radio signal via the selected antenna.

Second Exemplary Embodiment

Next, a wireless communication device according to a second exemplary embodiment of the present invention will be described. The wireless communication device of the second exemplary embodiment is different from the wireless communication device of the first exemplary embodiment in detecting the rotational position (device rotational position) of the wireless communication device relative to a user, and acquiring holding position specifying information based on the detected device rotational position. As such, description will be given below focusing on such a difference.

Figure 6:
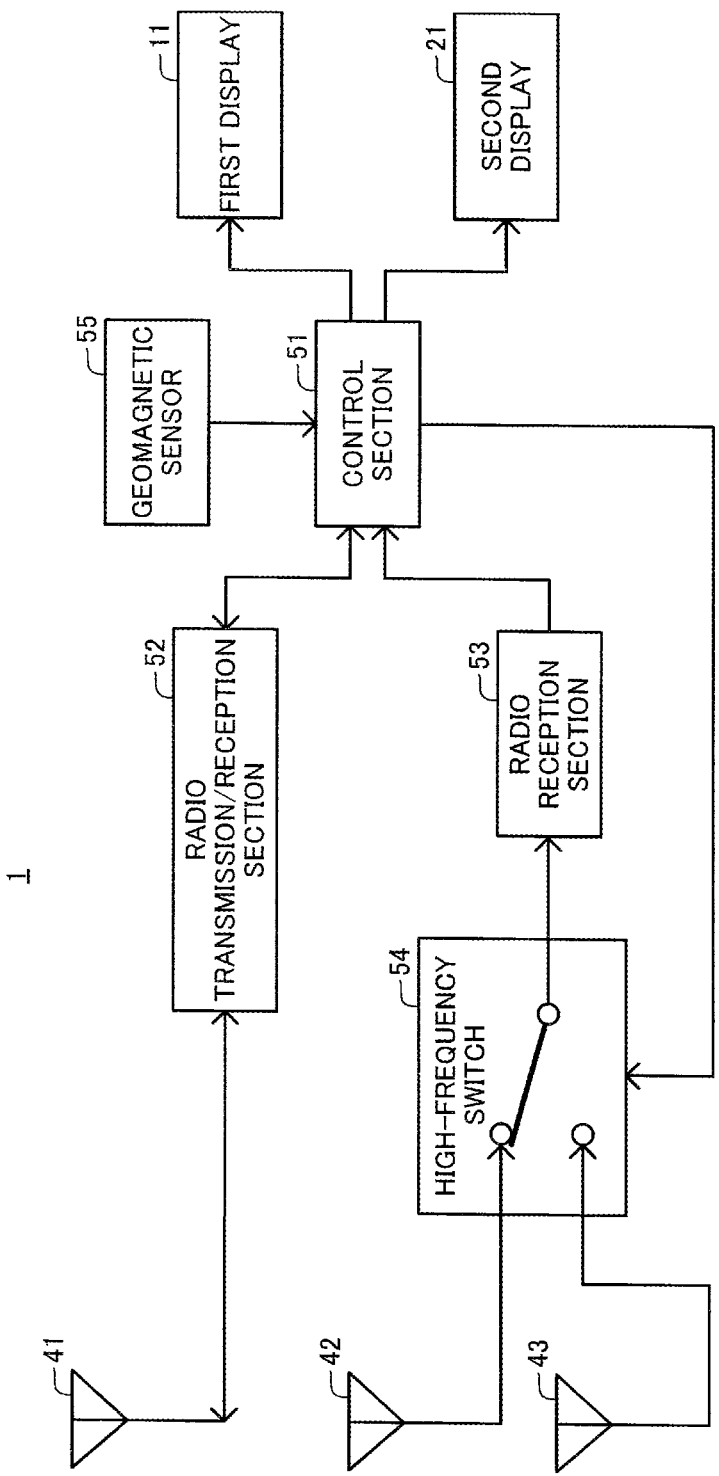
FIG. 6 is a block diagram showing the schematic configuration of a wireless communication device according to a second exemplary embodiment of the present invention.

As shown in FIG. 6, the wireless communication device 1 according to the second exemplary embodiment includes a geomagnetic sensor (part of an antenna selection means, device rotational position detector) 55, in addition to the components of the wireless communication device 1 of the first exemplary embodiment. The geomagnetic sensor 55 detects geomagnetism.

The control section 51 detects a device rotational position based on the geomagnetism detected by the geomagnetic sensor 55. In this example, the control section 51 detects that the device rotational position is the first device rotational position when the value of the detected geomagnetism is larger than a preset reference value, while detects that the device rotational position is the second device rotational position when the value of the detected geomagnetism is smaller than the reference value.

The control section 51 acquires device rotational position information representing the detected device rotational position as holding position specifying information.

In this example, the storage device included in the control section 51 stores holding position specifying information representing the first device rotational position and antenna specifying information for specifying the first antenna 43 in association with each other, and also stores holding position specifying information representing the second device rotational position and antenna specifying information for specifying the second antenna 42 in association with each other. The control section 51 selects an antenna specified by the antenna specifying information stored in the storage device in association with the acquired holding position specifying information.

Meanwhile, a user is likely to change the holding position when changing the rotational position of the wireless communication device 1 relative to the user. As such, according to the above-described configuration, it is possible to acquire holding position specifying information according to the actual holding position with high accuracy.

With the wireless communication device according to the second exemplary embodiment, actions and effects similar to those of the first exemplary embodiment can also be achieved.

It should be noted that in an exemplary variation of the second exemplary embodiment, the control section 51 may be adapted to acquire holding position specifying information based on device rotational position information representing the detected device rotational position and image rotational position information representing the selected image rotational position.

According to this configuration, it is possible to acquire holding position specifying information according to the actual holding position with higher accuracy, compared with the case of acquiring holding position specifying information based on either one of device rotational position information and image rotational position information.

Third Exemplary Embodiment

Next, a wireless communication device according to a third exemplary embodiment of the present invention will be described. The wireless communication device of the third exemplary embodiment is different from the wireless communication device of the first exemplary embodiment in detecting a holding position and acquiring holding position specifying information based on the detected holding position. Accordingly, description will be given below based on such a difference.

Figure 7:
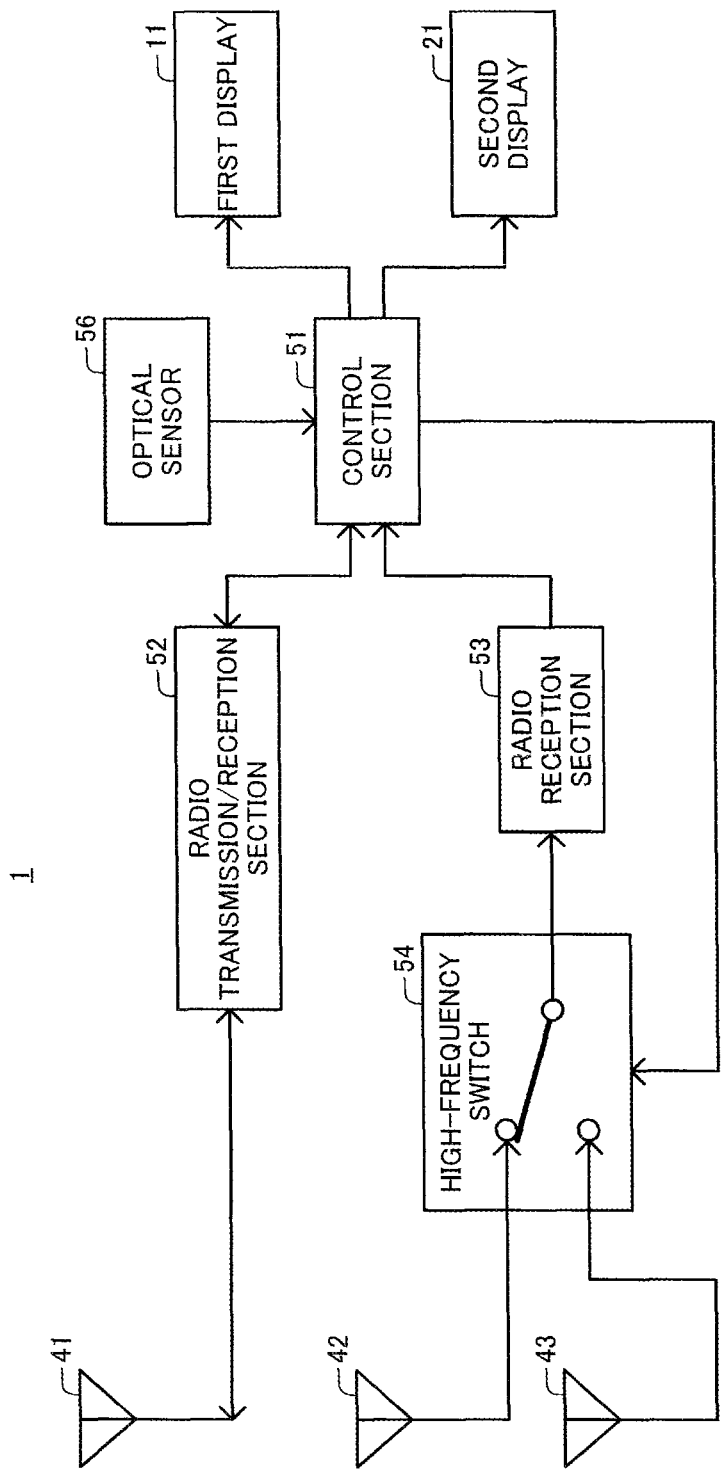
FIG. 7 is a block diagram showing the schematic configuration of a wireless communication device according to a third exemplary embodiment of the present invention.

As shown in FIG. 7, the wireless communication device 1 according to the third exemplary embodiment includes a plurality of optical sensors (part of antenna selection means, holding position detector) 56, in addition to the components of the wireless communication device 1 of the first exemplary embodiment.

The wireless communication device 1 according to the third exemplary embodiment has a plurality of openings which are open to the outside. In this example, the openings are formed in the four corners of the wireless communication device 1, respectively.

The optical sensor 56 is provided to each of the openings. Each of the optical sensors 56 detects the intensity of light entering from the outside via the opening.

The control section 51 detects the holding position based on the light intensities detected by the optical sensors 56. In this example, the control section 51 detects a position where the detected light intensity is smaller than a preset reference value as a holding position. In this example, a holding position is either the first holding position or the second holding position. The first holding position represents two corner portions located on the lower side of the wireless communication device 1 when the device rotational position is the first device rotational position. The second holding position represents two corner portions located on the lower side of the wireless communication device 1 when the device rotational position is the second device rotational position.

The control section 51 acquires holding position information representing the detected holding position as holding position specifying information.

In this example, the storage device included in the control section 51 stores holding position specifying information representing the first holding position and antenna specifying information for specifying the first antenna 43 in association with each other, and stores holding position specifying information representing the second holding position and antenna specifying information for specifying the second antenna 42 in association with each other. The control section 51 selects an antenna specified by the antenna specifying information stored in the storage device in association with the acquired holding position specifying information.

With the wireless communication device according to the third exemplary embodiment, actions and effects similar to that of the first exemplary embodiment can also be achieved.

Fourth Exemplary Embodiment

Figure 8:
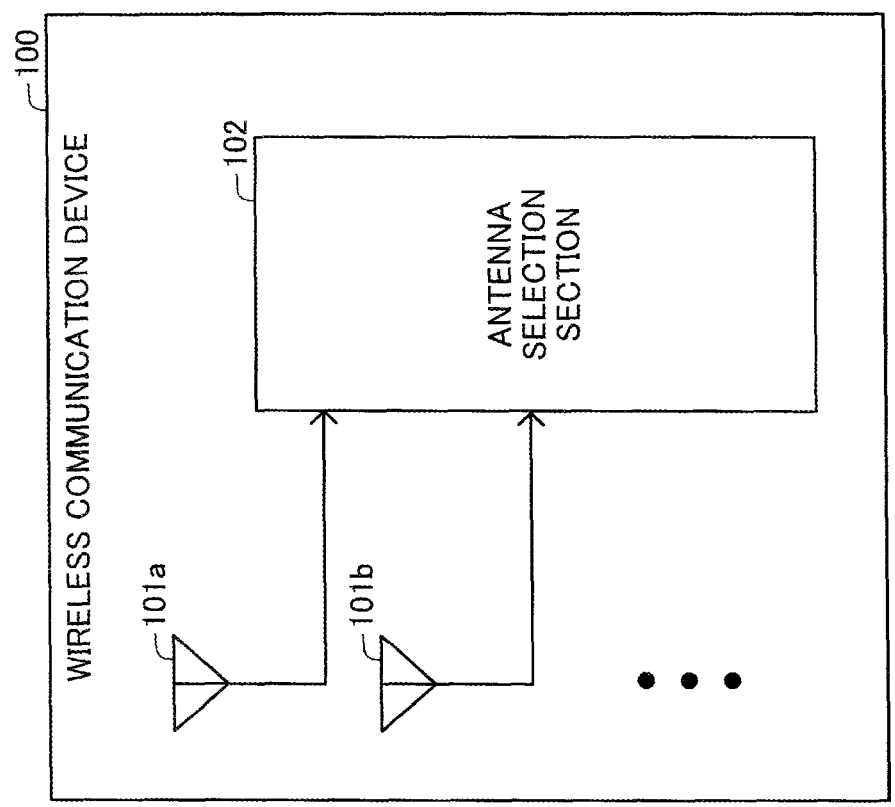
FIG. 8 is a block diagram showing the schematic configuration of a wireless communication device according to a fourth exemplary embodiment of the present invention.

Next, a wireless communication device according to a fourth exemplary embodiment of the present invention will be described with reference to FIG. 8. A wireless communication device 100 according to the fourth exemplary embodiment is a device which performs wireless communication.

The wireless communication device 100 includes a plurality of antennas 101a, 101b, . . . provided at different positions; and an antenna selection section (antenna section means) 102 which acquires holding position specifying information for specifying a holding position which is a position where a user holds the wireless communication device 100, and from among the plurality of antennas 101a, 101b, . . . , selects an antenna provided at a position which is different from the holding position specified by the acquired holding position specifying information, wherein the wireless communication device 100 is adapted to perform wireless communication via the selected antenna.

A radio signal received and transmitted by the antenna provided at the holding position is attenuated by (the hand of) the user. This means that the quality of wireless communication performed via such an antenna is often lowered (deteriorated). As such, by configuring the wireless communication device 100 as described above, the wireless communication device 100 is able to perform wireless communication via an antenna provided at a position different from the holding position. Consequently, it is possible to prevent an excessive drop in the quality of wireless communication.

Further, according to the above-described configuration, it is not necessary to provide a circuit for detecting reception levels and to provide a circuit for comparing detected reception levels. Accordingly, the size of the wireless communication device 100 can be reduced. Further, as a processing device is not required to perform processing to compare detected reception levels, in the case where the wireless communication device 100 includes a processing device, it is also possible to prevent an excessively large processing load.

In this case, it is preferable that the wireless communication device includes an information storage means for storing the holding position specifying information and antenna specifying information for specifying the antenna in association with each other, and that the antenna selection means is adapted to select the antenna specified by the antenna specifying information stored in association with the acquired holding position specifying information.

In this case, it is preferable that the wireless communication device further includes:

an image information generation means for generating image information representing an image; and a display which displays the image represented by the generated image information, that the image information generation means is adapted to select an image rotational position which is a rotational position of the image relative to the display from among a plurality of different image rotational positions, and generate the image information representing the image taking the selected image rotational position, and that the antenna selection means is adapted to acquire image rotational position information representing the selected image rotational position as the holding position specifying information.

When the rotational position of an image relative to the display is changed, a user is likely to change the holding position. As such, according to the above-described configuration, it is possible to acquire holding position specifying information according to the actual holding position with high accuracy.

In this case, it is preferable that the antenna selection means is adapted to acquire, after a preset delay time has elapsed from the point of time when the selected image rotational position was changed, image rotational position information representing the image rotational position after the change as the holding position specifying information.

When the image rotational position of the image shown on the display is changed, it often takes a delay time from the point of time when the image rotational position was changed until the user changes the holding position of the wireless communication device. As such, according to the above-described configuration, the time when the holding position was actually changed and the time of changing the selected antenna can be closer. Consequently, it is possible to prevent an excessive drop in the quality of wireless communication, more reliably.

Further, in another form of the wireless communication device, it is preferable that the antenna selection means is adapted to detect a device rotational position which is a rotational position of the wireless communication device relative to a user, and acquire device rotational position information representing the detected device rotational position as the holding position specifying information.

When a user changes the rotational position of the wireless communication device relative to the user, the user is likely to change the holding position. As such, according to the above-described configuration, it is possible to acquire holding position specifying information according to the actual holding position with high accuracy.

In this case, it is preferable that the antenna selection means includes a geomagnetic sensor which detects geomagnetism, and that the antenna selection means is adapted to detect the device rotational position based on the geomagnetism detected by the geomagnetic sensor.

Further, in another form of the wireless communication device, it is preferable that the antenna selection means is adapted to detect the holding position, and acquire holding position information representing the detected holding position as the holding position specifying information.

In this case, it is preferable that the antenna selection means includes an optical sensor which detects an intensity of light, and that the antenna selection means is adapted to detect the holding position based on the intensity of light detected by the optical sensor.

Further, it is preferable that the wireless communication device according to another form of the present invention includes:

an image information generation means for generating image information representing an image; and a display which displays the image represented by the generated image information, that the image information generation means is adapted to select an image rotational position which is a rotational position of the image relative to the display from among a plurality of different image rotational positions, and generate the image information representing the image taking the selected image rotational position, and that the antenna selection means is adapted to detect a device rotational position which is a rotational position of the wireless communication device relative to a user, and acquire the holding position specifying information based on device rotational position information representing the detected device rotational position and image rotational position information representing the selected image rotational position.

With this configuration, it is possible to acquire holding position specifying information according to the actual holding position with higher accuracy, compared with the case of acquiring holding position specifying information based on either one of device rotational position information and image rotational position information.

In this case, it is preferable that the plurality of antennas include:

a first antenna arranged at, when a device rotational position which is a rotational position of the wireless communication device relative to a user is a first device rotational position, a first edge portion which is an edge portion having a longest distance from the user; and a second antenna arranged at, when the device rotational position is a second device rotational position which is different from the first device rotational position, a second edge portion which is an edge portion having a longest distance from the user, and that the antenna selection means is adapted to select either one of the first antenna and the second antenna.

Meanwhile, a user is likely to hold edge portions having the shortest distance from the user in the edge part of the wireless communication device. As such, according to the above-described configuration, when the device rotational position is the first device rotational position, the first antenna is at a position different from the holding position, while when the device rotational position is the second device rotational position, the second antenna is at a position different from the holding position. As a result, the wireless communication device is able to select an antenna arranged at a position different from the holding position reliably, even when the device rotational position is either the first device rotational position or the second device rotational position.

Further, a mobile phone device, which is another aspect of the present invention, is a device which performs wireless communication.

The mobile phone device includes:

a plurality of antennas provided at different positions; and an antenna selection means for acquiring holding position specifying information for specifying a holding position which is a position where a user holds the mobile phone device, and from among the plurality of antennas, selecting an antenna provided at a position which is different from the holding position specified by the acquired holding position specifying information, wherein the mobile phone device is adapted to perform wireless communication via the selected antenna.

In this case, it is preferable that the mobile phone device further includes an information storage means for storing the holding position specifying information and antenna specifying information for specifying the antenna in association with each other, and that the antenna selection means is adapted to select the antenna specified by the antenna specifying information stored in association with the acquired holding position specifying information.

In this case, it is preferable that the mobile phone device further includes:

an image information generation means for generating image information representing an image; and a display which displays the image represented by the generated image information, that the image information generation means is adapted to select an image rotational position which is a rotational position of the image relative to the display from among a plurality of different image rotational positions, and generate the image information representing the image taking the selected image rotational position, and that the antenna selection means is adapted to acquire image rotational position information representing the selected image rotational position as the holding position specifying information.

Further, in another form of the mobile phone device, it is preferable that the antenna selection means is adapted to detect a device rotational position which is a rotational position of the mobile phone device relative to a user, and acquire device rotational position information representing the detected device rotational position as the holding position specifying information.

Further, in another form of the mobile phone device, it is preferable that the antenna selection means is adapted to detect the holding position, and acquire holding position information representing the detected holding position as the holding position specifying information.

Further, a wireless communication method which is another aspect of the present invention is a method applied to a wireless communication device which includes a plurality of antennas provided at different positions and performs wireless communication.

The method includes:

acquiring holding position specifying information for specifying a holding position which is a position where a user holds the wireless communication device;

from among the plurality of antennas, selecting an antenna provided at a position which is different from the holding position specified by the acquired holding position specifying information; and performing wireless communication via the selected antenna.

In this case, it is preferable that the wireless communication method further includes selecting the antenna specified by antenna specifying information stored in a storage device in association with the acquired holding position specifying information, the storage device storing the holding position specifying information and the antenna specifying information for specifying the antenna in association with each other.

In this case, it is preferable that the wireless communication device includes a display which displays an image represented by image information, and that the method further includes:

selecting an image rotational position which is a rotational position of the image relative to the display from among a plurality of different image rotational positions;

generating the image information representing the image taking the selected image rotational position; and acquiring image rotational position information representing the selected image rotational position as the holding position specifying information.

Further, it is preferable that the wireless communication method according to another form of the present invention further includes:

detecting a device rotational position which is a rotational position of the wireless communication device relative to a user; and acquiring device rotational position information representing the detected device rotational position as the holding position specifying information.

Further, it is preferable that the wireless communication method according to another form of the present invention further includes:

detecting the holding position; and acquiring holding position information representing the detected holding position as the holding position specifying information.

Further, a program which is another aspect of the present invention is a program for causing a wireless communication device which includes a plurality of antennas provided at different positions and performs wireless communication, to realize an antenna selection means for acquiring holding position specifying information for specifying a holding position which is a position where a user holds the wireless communication device, and from among the plurality of antennas, selecting an antenna provided at a position which is different from the holding position specified by the acquired holding position specifying information, and to perform wireless communication via the selected antenna.

In this case, it is preferable that the antenna selection means is adapted to select the antenna specified by antenna specifying information stored in a storage device in association with the acquired holding position specifying information, the storage device storing the holding position specifying information and the antenna specifying information for specifying the antenna in association with each other.

In this case, it is preferable that the wireless communication device includes a display which displays an image represented by image information, that the program further causes the wireless communication device to realize an image information generation means for generating image information representing an image, that the image information generation means is adapted to select an image rotational position which is a rotational position of the image relative to the display from among a plurality of different image rotational positions, and generate the image information representing the image taking the selected image rotational position, and that the antenna selection means is adapted to acquire image rotational position information representing the selected image rotational position as the holding position specifying information.

Further, in another form of the program, it is preferable that the wireless communication device includes a device rotational position detector which detects a device rotational position which is a rotational position of the wireless communication device relative to a user, and that the antenna selection means is adapted to acquire device rotational position information representing the detected device rotational position as the holding position specifying information.

Further, in another form of the program, it is preferable that the wireless communication device includes a holding position detector which detects the holding position, and that the antenna selection means is adapted to acquire holding position information representing the detected holding position as the holding position specifying information.

As an invention of a mobile phone device, a wireless communication method, or a program having the above-described configuration has actions similar to those of the wireless communication device, such an invention is also able to achieve the object of the present invention.

While the present invention has been described with reference to the exemplary embodiments, the present invention is not limited to these exemplary embodiments. It will be understood by those killed in the art that various changes in form and details may be made therein within the scope of the present invention.

For example, although the wireless communication device 1 is a foldable device in each of the exemplary embodiments, it may be a slide-type device configured such that the first body section and the second body section are movable in parallel. Further, the wireless communication device 1 may be a straight-type device formed of one body section.

Further, although the wireless communication device 1 is a mobile phone device in each of the exemplary embodiments, it may be a PDA (Personal Data Assistance), a notebook PC (laptop PC), an electronic dictionary device, a smart phone, a PHS (Personal Handyphone System), an audio device, a navigation device, a game device, or the like.

It should be noted that while, in each of the exemplary embodiments, the respective functions of the wireless communication device 1 are realized by the hardware, the wireless communication device 1 may be adapted to realize the functions by the processing device which executes a program stored in the storage device. In that case, the program may be stored in a computer-readable recording medium. For example, a recording medium is a portable medium such as a flexible disk, an optical disk, a magneto-optical disk, a semiconductor memory, or the like.

Further, as another exemplary variation of the exemplary embodiments, any combinations of the exemplary embodiments and exemplary variations described above may be adopted.

This application is based upon and claims the benefit of priority from Japanese patent application No. 2009-240141, filed on Oct. 19, 2009, the disclosure of which is incorporated herein in its entirety by reference.

INDUSTRIAL APPLICABILITY

The present invention is applicable to mobile phone devices, portable game devices which perform wireless communication, and the like.

REFERENCE NUMERALS 1 wireless communication device
10 first body section
11 first display
20 second body section
21 second display
22 button switch
30 hinge section
41 antenna
42 antenna (second antenna)
43 antenna (first antenna)
51 control section
52 radio transmission/reception section
53 radio reception section
54 high-frequency switch
55 geomagnetic sensor
56 optical sensor
100 wireless communication device
101a, 101b antenna
102 antenna selection section

The invention claimed is:

1. A wireless communication device comprising:
a first body section having a first display;
a second body section having a second display;
a hinge section linking the first and second body sections with each other so that the device is a foldable device;
a plurality of antennas, wherein,
when the first body section is positioned on an upper side and the second body section is positioned on a lower side:
i) a first antenna of said antennas is arranged at a corner portion which is positioned at one edge part in a horizontal direction of the upper side of the first body section,
ii) a second antenna of said antennas is arranged at a edge portion which is positioned at another one edge part in the horizontal direction of the first body section, and
iii) a third antenna of said antennas is arranged at a edge portion which is positioned at another one edge part in the horizontal direction of the second body section; and
an antenna selection unit adapted to acquire holding position specifying information for specifying a holding position which is a position where a user holds the wireless communication device, and from among the plurality of antennas, selecting an antenna provided at a position which is different from the holding position specified by the acquired holding position specifying information, wherein
the wireless communication device is adapted to perform wireless communication via the selected antenna.

2. The wireless communication device according to claim 1, further comprising:
an information storage unit adapted to store the holding position specifying information and antenna specifying information for specifying the antenna in association with each other, wherein
the antenna selection unit is adapted to select the antenna specified by the antenna specifying information stored in association with the acquired holding position specifying information.

3. The wireless communication device according to claim 1, further comprising:
an image information generation unit adapted to generate image information representing an image; and
a display which displays the image represented by the generated image information, wherein
the image information generation unit is adapted to select an image rotational position which is a rotational position of the image relative to the display from among a plurality of different image rotational positions, and generate the image information representing the image taking the selected image rotational position, and
the antenna selection unit is adapted to acquire image rotational position information representing the selected image rotational position as the holding position specifying information.

4. The wireless communication device according to claim 3, wherein
the antenna selection unit is adapted to acquire, after a preset delay time has elapsed from a point of time when the selected image rotational position was changed, image rotational position information representing the image rotational position after the change as the holding position specifying information.

5. The wireless communication device according to claim 1, wherein
the antenna selection unit is adapted to detect a device rotational position which is a rotational position of the wireless communication device relative to a user, and acquire device rotational position information representing the detected device rotational position as the holding position specifying information.

6. The wireless communication device according to claim 5, wherein
the antenna selection unit includes a geomagnetic sensor which detects geomagnetism, and is adapted to detect the device rotational position based on the geomagnetism detected by the geomagnetic sensor.

7. The wireless communication device according to claim 1, wherein
the antenna selection unit is adapted to detect the holding position, and acquire holding position information representing the detected holding position as the holding position specifying information.

8. The wireless communication device according to claim 7, wherein
the antenna selection unit includes an optical sensor which detects an intensity of light, and is adapted to detect the holding position based on the intensity of light detected by the optical sensor.

9. The wireless communication device according to claim 1, further comprising:
an image information generation unit adapted to generate image information representing an image; and
a display which displays the image represented by the generated image information, wherein the image information generation unit is adapted to select an image rotational position which is a rotational position of the image relative to the display from among a plurality of different image rotational positions, and generate the image information representing the image taking the selected image rotational position, and the antenna selection unit is adapted to detect a device rotational position which is a rotational position of the wireless communication device relative to a user, and acquire the holding position specifying information based on device rotational position information representing the detected device rotational position and image rotational position information representing the selected image rotational position.

10. The wireless communication device according to claim 1, wherein the first antenna is arranged at, when a device rotational position which is a rotational position of the wireless communication device relative to a user is a first device rotational position, a first edge portion which is an edge portion having a longest distance from the user, and the second antenna is arranged at, when the device rotational position is a second device rotational position which is different from the first device rotational position, a second edge portion which is an edge portion having a longest distance from the user, wherein the antenna selection unit is adapted to select either one of the first antenna and the second antenna.

11. A mobile phone device comprising:
a first body section having a first display;
a second body section having a second display;
a hinge section linking the first and second body sections with each other, the device being foldable at the hinge section;
a plurality of antennas, wherein,
when the first body section is positioned on an upper side and the second body section is positioned on a lower side
i) a first antenna of said antennas is arranged at a corner portion which is positioned at one edge part in a horizontal direction of the upper side of the first body section,
ii) a second antenna of said antennas is arranged at a edge portion which is positioned at another one edge part in the horizontal direction of the first body section, and
iii) a third antenna of said antennas is arranged at a edge portion which is positioned at another one edge part in the horizontal direction of the second body section; and
an antenna selection unit adapted to acquire holding position specifying information for specifying a holding position which is a position where a user holds the mobile phone device, and from among the plurality of antennas, selecting an antenna provided at a position which is different from the holding position specified by the acquired holding position specifying information, wherein
the mobile phone device is adapted to perform wireless communication via the selected antenna.

12. The mobile phone device according to claim 11, further comprising:
an information storage unit adapted to store the holding position specifying information and antenna specifying information for specifying the antenna in association with each other, wherein
the antenna selection unit is adapted to select the antenna specified by the antenna specifying information stored in association with the acquired holding position specifying information.

13. The mobile phone device according to claim 11, further comprising:
an image information generation unit adapted to generate image information representing an image; and
a display which displays the image represented by the generated image information, wherein
the image information generation unit is adapted to select an image rotational position which is a rotational position of the image relative to the display from among a plurality of different image rotational positions, and generate the image information representing the image taking the selected image rotational position, and
the antenna selection unit is adapted to acquire image rotational position information representing the selected image rotational position as the holding position specifying information.

14. The mobile phone device according to claim 11, wherein
the antenna selection unit is adapted to detect a device rotational position which is a rotational position of the mobile phone device relative to a user, and acquire device rotational position information representing the detected device rotational position as the holding position specifying information.

15. The mobile phone device according to claim 11, wherein
the antenna selection unit is adapted to detect the holding position, and acquire holding position information representing the detected holding position as the holding position specifying information.

16. A wireless communication method applied to a foldable wireless communication device which includes a plurality of antennas provided at different positions and performs wireless communication, the method comprising:
positioning the wireless communication device so that a first body section having a first display and a second body section having a second display are linked to each over by a hinge section so that when the first body section is positioned on an upper side and the second body section is positioned on a lower side:
i) a first antenna of said antennas is arranged at a corner portion which is positioned at one edge part in a horizontal direction of the upper side of the first body section,
ii) a second antenna of said antennas is arranged at a edge portion which is positioned at another one edge part in the horizontal direction of the first body section, and
iii) a third antenna of said antennas is arranged at a edge portion which is positioned at another one edge part in the horizontal direction of the second body section;
acquiring holding position specifying information for specifying a holding position which is a position where a user holds the wireless communication device;
from among the plurality of antennas, selecting an antenna provided at a position which is different from the holding position specified by the acquired holding position specifying information; and
performing wireless communication via the selected antenna.

17. The wireless communication method according to claim 16, further comprising
selecting the antenna specified by antenna specifying information stored in a storage device in association with the acquired holding position specifying information, the storage device storing the holding position specifying information and the antenna specifying information for specifying the antenna in association with each other.

18. The wireless communication method according to claim 16, wherein
the wireless communication device includes a display which displays an image represented by image information, and
the method further comprises:
selecting an image rotational position which is a rotational position of the image relative to the display from among a plurality of different image rotational positions;
generating the image information representing the image taking the selected image rotational position; and
acquiring image rotational position information representing the selected image rotational position as the holding position specifying information.

19. The wireless communication method according to claim 16, further comprising:
detecting a device rotational position which is a rotational position of the wireless communication device relative to a user; and
acquiring device rotational position information representing the detected device rotational position as the holding position specifying information.

20. The wireless communication method according to claim 16, further comprising:
detecting the holding position; and
acquiring holding position information representing the detected holding position as the holding position specifying information.

21. A non-transitory computer-readable medium storing a program comprising instructions for causing a foldable wireless communication device which includes a plurality of antennas provided at different positions and performs wireless communication, including:
to position the wireless communication device so that a first body section having a first display and a second body section having a second display are linked to each over by a hinge section so that when the first body section is positioned on an upper side and the second body section is positioned on a lower side:
i) a first antenna of said antennas is arranged at a corner portion which is positioned at one edge part in a horizontal direction of the upper side of the first body section,
ii) a second antenna of said antennas is arranged at a edge portion which is positioned at another one edge part in the horizontal direction of the first body section, and
iii) a third antenna of said antennas is arranged at a edge portion which is positioned at another one edge part in the horizontal direction of the second body section;
to realize an antenna selection unit adapted to acquire holding position specifying information for specifying a holding position which is a position where a user holds the wireless communication device, and from among the plurality of antennas, selecting an antenna provided at a position which is different from the holding position specified by the acquired holding position specifying information, and
to perform wireless communication via the selected antenna.

22. The computer-readable medium according to claim 21, wherein
the antenna selection unit is adapted to select the antenna specified by antenna specifying information stored in a storage device in association with the acquired holding position specifying information, the storage device storing the holding position specifying information and the antenna specifying information for specifying the antenna in association with each other.

23. The computer-readable medium according to claim 21, wherein
the wireless communication device includes a display which displays an image represented by image information,
the program further causes the wireless communication device to realize an image information generation unit adapted to generate image information representing an image,
the image information generation unit is adapted to select an image rotational position which is a rotational position of the image relative to the display from among a plurality of different image rotational positions, and generate the image information representing the image taking the selected image rotational position, and
the antenna selection unit is adapted to acquire image rotational position information representing the selected image rotational position as the holding position specifying information.

24. The computer-readable medium according to claim 21, wherein
the wireless communication device includes a device rotational position detector which detects a device rotational position which is a rotational position of the wireless communication device relative to a user, and
the antenna selection unit is adapted to acquire device rotational position information representing the detected device rotational position as the holding position specifying information.

25. The computer-readable medium according to claim 21, wherein
the wireless communication device includes a holding position detector which detects the holding position, and
the antenna selection unit is adapted to acquire holding position information representing the detected holding position as the holding position specifying information.

26. A wireless communication device which performs wireless communication, comprising:
a plurality of antennas provided at different positions; and
antenna selection means for acquiring holding position specifying information for specifying a holding position which is a position where a user holds the wireless communication device, and from among the plurality of antennas, selecting an antenna provided at a position which is different from the holding position specified by the acquired holding position specifying information, wherein
the wireless communication device is adapted to perform wireless communication via the selected antenna.

27. A mobile phone device, comprising:
a first body section having a first display;
a second body section having a second display;
a hinge section linked the first and second body sections with each other, the device being foldable at the hinge section;
a plurality of antennas,
the antennas being positioned so that when the first body section is positioned on an upper side and the second body section is positioned on a lower side
i) a first antenna of said antennas is arranged at a corner portion which is positioned at one edge part in a horizontal direction of the upper side of the first body section, ii) a second antenna of said antennas is arranged at a edge portion which is positioned at another one edge part in the horizontal direction of the first body section, and iii) a third antenna of said antennas is arranged at a edge portion which is positioned at another one edge part in the horizontal direction of the second body section; and antenna selection means for acquiring holding position specifying information for specifying a holding position which is a position where a user holds the mobile phone device, and from among the plurality of antennas, selecting an antenna provided at a position which is different from the holding position specified by the acquired holding position specifying information, wherein the mobile phone device is adapted to perform wireless communication via the selected antenna.

* * * * *